(12) United States Patent
Ichige et al.

(10) Patent No.: US 8,387,450 B2
(45) Date of Patent: Mar. 5, 2013

(54) CHASSIS DYNAMOMETER

(75) Inventors: Tatsuo Ichige, Saitama (JP); Hidenori Nagai, Kanagawa (JP); Mieko Nagai, legal representative, Yokohama (JP); Yoshihiro Okamoto, Kanagawa (JP)

(73) Assignees: A&D Company, Limited, Tokyo (JP); Toyo Electric Mfg. Co., Ltd., Tokyo (JP)

( * ) Notice: Subject to any disclaimer, the term of this patent is extended or adjusted under 35 U.S.C. 154(b) by 0 days.

(21) Appl. No.: 13/230,873

(22) Filed: Sep. 13, 2011

(65) Prior Publication Data

US 2012/0060596 A1  Mar. 15, 2012

Related U.S. Application Data

(62) Division of application No. 12/298,870, filed on Oct. 28, 2008, now Pat. No. 8,037,743.

(30) Foreign Application Priority Data

Apr. 28, 2006  (JP) ................... 2006-125672

(51) Int. Cl.
*G01M 17/007* (2006.01)
(52) U.S. Cl. ...................... 73/116.06; 73/123

(58) Field of Classification Search ............... 73/116.01, 73/116.05, 116.06, 116.07, 116.08, 123
See application file for complete search history.

(56) References Cited

U.S. PATENT DOCUMENTS

| | | | | |
|---|---|---|---|---|
| 3,908,280 A * | 9/1975 | Murakami et al. | ......... | 33/203.13 |
| 4,077,255 A * | 3/1978 | Murakami | ................ | 73/116.06 |
| 4,324,133 A * | 4/1982 | Stevenson | ................ | 73/116.06 |
| 5,311,770 A * | 5/1994 | D'Angelo | ................ | 73/116.06 |
| 6,439,037 B1 * | 8/2002 | D'Angelo | ................ | 73/116.08 |
| 6,457,352 B1 * | 10/2002 | Knestel | ................ | 73/117.03 |
| 6,860,145 B2 * | 3/2005 | Bergst et al. | ................ | 73/123 |
| 2004/0200272 A1 * | 10/2004 | Bergst et al. | ................ | 73/123 |
| 2008/0011072 A1 * | 1/2008 | Bergeron | ................ | 73/118.1 |

* cited by examiner

*Primary Examiner* — Eric S McCall
(74) *Attorney, Agent, or Firm* — Osha Liang LLP

(57) ABSTRACT

A chassis dynamometer for a vehicle has a base seat, a fixed shaft having one end thereof attached to the base seat, a rotary proximal portion rotatably supported to the fixed shaft, a roller connected to the rotary proximal portion, for loading a wheel of a vehicle, and a motor connected to the roller so that power can be transmitted therebetween. The roller has a single flange portion connected to the rotary proximal portion and extending obliquely to the axis, and an outer peripheral portion extending both axial directions from an outer periphery of the flange portion and disposed outward in the radial direction of the motor.

13 Claims, 11 Drawing Sheets

CHASSIS DYNAMOMETER

This is a divisional of application Ser. No. 12/298,870, U.S. Pat. No. 8,037,743 filed on Oct. 28, 2008, and patented on Oct. 18, 2011.

TECHNICAL FIELD

The present invention relates to a chassis dynamometer for detecting torque of drive wheels of a vehicle.

The chassis dynamometer is generally employed for conducting a dynamic traveling performance test of the vehicle indoors. More specifically, the chassis dynamometer is constructed so that the drive wheels of the vehicle are placed on rotatable rollers in place of a road surface and set in a traveling state, the torque is measured by transferring the torque of the drive wheels to the rollers, and predetermined resistance (traveling resistance) received by the wheels from the road surface can be given in the dynamic test such as a variety of acceleration tests and exhaust gas mode tests.

The chassis dynamometer in the prior art is exemplified in FIG. 1. In FIG. 1, a motor M is installed on a base B placed on a ground surface or a floor surface. Two rollers R1, R2 are connected to a rotary shaft S protruding from one side of the motor M, and an end portion of the rotary shaft S is rotatably supported by a pillar-post P.

Another type of chassis dynamometer in the prior art is exemplified in Patent document 1, and FIG. 2 shows a schematic view thereof. In FIG. 2, the motor M is placed on the base B installed on the ground surface or the floor surface. The two rollers R1, R2 are connected to the cantilever type rotary shaft S protruding from both sides of the motor M.

According to this type of chassis dynamometer, drive wheels T, T of a vehicle V are placed on the rollers R1, R2, and the rollers R1, R2 are rotated by driving force thereof, thereby enabling a torque meter to measure the torque. Further, the motor M rotates the rotary shaft S to transfer power to the drive wheels T, T via the rollers R1, R2, thereby enabling the resistance of the driving system of the vehicle to be measured.

By the way, as illustrated in FIGS. 1 and 2, in the case of disposing the rollers R1, R2 on the rotary shaft S of the motor M, a shaft-end load applied to the rotary shaft S of the motor M increases, which entails taking it into consideration to raise a flexural strength and a withstand load of a bearing in terms of a structural design. By contrast, it can be also considered to enlarge a diameter of the rotary shaft S and to increase a load capacity of the bearing, however, the apparatus is to be upsized in order to increase the structural strength, and a cost might be raised. Another thinkable scheme is a structure for supporting the both sides of the rollers R1, R2 with the bearings, however, the increase in the number of the bearings leads to a large loss of the mechanical rotations, resulting in a possibility of deterioration of measuring accuracy.

Moreover, as far as the rollers R1, R2 each having a large inertial mass are connected to the rotary shaft S, such a state arises that the torsion rigidity of a rotation system decreases and a torsion resonance frequency decreases. If intended only to increase the torsion rigidity, it may be sufficient that the rotary shaft be thickened, however, the thickened shaft leads to an ill-balanced structure and an upsizing problem which will arise. Additionally, when a shaft torque meter is inserted on the side of the rotary shaft, the rigidity of the rotary shaft further decreases, and fluctuations in torque might be caused with rotations at a torsion resonance point.

Furthermore, in the chassis dynamometers in FIGS. 1 and 2, the rollers R1, R2 are fixed to the rotary shaft, and hence it is required that widths of the rollers R1, R2 be previously ensured large enough to have flexibility to vehicles each having a different width. When increasing the widths of the rollers R1, R2, however, there arises a problem that the inertial mass further increases. Particularly, there is a request for performing a test for a low p path on the chassis dynamometer, which entails reducing the inertial masses of the rollers R1, R2 to the greatest possible degree, and, though the roller width is desired to be as narrow as possible, such a problem occurs that the test-enabled vehicles are restricted if the widths of the rollers R1, R2 are narrowed. Especially in the chassis dynamometer in FIG. 2, the motor M is located between the rollers R1, R2, and this arrangement becomes a restriction on the occasion of narrowing an interval between the rollers R1, R2 and might disable a vehicle with a narrow tread such as a light car from undergoing a test.

On the other hand, a technique of enabling a frame of the motor to oscillate, then measuring a force receiving as reaction by a load cell via an arm and converting the force into torque, is known as one technique of measuring the torque in the conventional chassis dynamometer. Further, another known technique of measuring the torque is a technique of fitting a shaft torque meter to an output shaft of the motor and directly measuring the torque. In order to obtain more of accuracy for the measurement, however, a loss of the bearing and a windage loss are measured beforehand, and it is necessary to take a technique for canceling these losses.

Since the loss of the bearing greatly changes depending on a weight of the vehicle and a temperature during an operation, it is difficult to specify the loss with high accuracy, and it is therefore extremely hard to make the precise measurement. Moreover, the oscillation-based measuring technique has a problem in terms of low rigidity caused from a frame of the motor and a spring constant of the load cell, and has a tendency of being unable to evaluate quickly due to a delay of response of the measurement. By contrast, the measurement, which involves using the shaft torque meter, takes a structure decreasing the rigidity of the rotation system in many cases, then it follows that there exists resonance in the mechanical system having a low frequency, and a problem is that a demanded design is the design causing no overlap of the rotating speed in a measuring range. Note that Patent document 2 discloses a configuration for measuring the torque of the wheel of the vehicle and correcting the absorption torque of the motor, but has a problem that the configuration gets complicated.

[Patent document 1] Japanese Patent Laid-Open Publication No. H06-50850
[Patent document 2] Japanese Patent Laid-Open Publication No. H05-240739

DISCLOSURE OF THE INVENTION

It is an object of the present invention, which was devised in view of the problems inherent in the prior arts, to provide a compact chassis dynamometer capable of performing a high-accuracy test or a high-accuracy measurement about a variety of vehicles.

A chassis dynamometer according to a first invention is characterized in that at least part of a motor is disposed inward in a radial direction of each of rollers on which to place wheels of a vehicle.

A chassis dynamometer according to a second invention is characterized in that a flange portion extending inward in a radial direction from each of rollers on which to place wheels of a vehicle and a rotor bracket for supporting a rotor of a motor are connected via a torque meter capable of measuring at least an outer peripheral tangential force of the roller.

According to the chassis dynamometer in the first invention, at least part of the motor is disposed inward in the radial direction of each of the rollers on which to place the wheels of the vehicle, whereby a rotary shaft of the motor can be shortened or eliminated as the case may be, then torsion rigidity of a rotation system is increased though schemed to thereby save a space, and a rotational balance can be improved by concentrating heavy masses. Moreover, since a vehicle load can be applied from outward in the radial direction to bearings that bear the rollers, a flexural moment does not act unlike a case of supporting a rotary shaft as by a conventional technology, and a long life-span of the bearing can be ensured. Moreover, the motor is provided inwardly of the rollers, and hence a distance between the rollers can be arbitrarily set. Accordingly, the same chassis dynamometers are installed in adjustment to positions of the individual wheels of the vehicle, whereby a width of the roller can be reduced, an inertial mass can be restrained small, and consequently a test for a low μ path can be reenacted on a bench.

It is preferable that the motor includes a stator fitted to a base seat and a rotor fitted to the roller so as to rotate integrally with the roller.

When the stator is disposed outward in the radial direction with respect to the rotor, the motor serving as an in-roller motor generating the high torque can be incorporated into the roller.

When the stator is disposed inward in the radial direction with respect to the rotor, the motor serving as the in-roller motor generating the high torque can be incorporated into the roller.

According to the chassis dynamometer in the second invention, the flange portion extending inward in the radial direction from each of the rollers on which to place the wheels of the vehicle and the rotor bracket for supporting the rotor of the motor are connected via the torque meter capable of measuring at least the outer peripheral tangential force of the roller, thereby enabling the measurement of the torque to be avoided from being affected by the bearing. Accordingly, an error in the measurement of the torque is caused mainly by a windage loss of the roller. The windage loss, which is determined based on the structure of the roller and can be reduced to the greatest possible degree, takes a stable value without being influenced by a temperature after the structure has been determined and can be precisely corrected. Namely, according to the present invention, the precise measurement, which was not attained by the prior arts, can be realized. Further, there is no necessity for providing the rotary shaft of the motor with the shaft torque meter, and therefore the torsion rigidity can be designed to be extremely high in terms of a mechanical structure, whereby an evaluation of the measurement of the torque in a fast response can be actualized.

When the motor is disposed inward in the radial direction of the roller, the rotary shaft of the motor can be shortened or eliminated as the case may be, then the torsion rigidity of the rotation system is increased though schemed to thereby save the space, and the rotational balance can be improved by concentrating the heavy masses.

It is preferable that the torque meter is a six-force-component meter because of being capable of measuring an outer peripheral tangential force acting on the roller, i.e., the force components other than in the traveling direction of the vehicle.

When the rollers and the motors are provided on a plurality-by-plurality basis and operate independently, the chassis dynamometers are provided for the respective drive wheels of an all-wheel-drive vehicle, whereby each drive wheel can be tested.

BEST MODE FOR CARRYING OUT THE INVENTION

Figure 1:
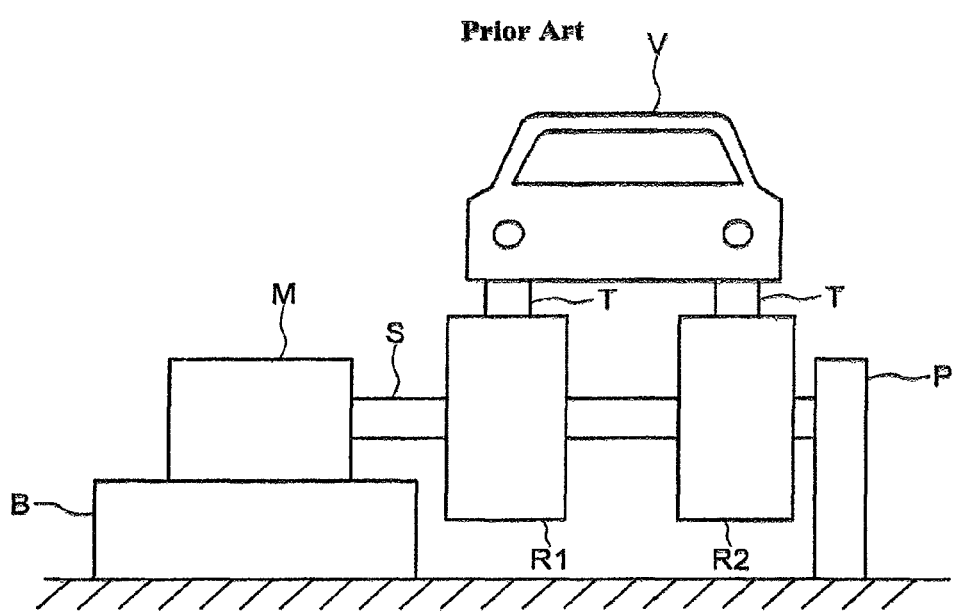
FIG. 1 A schematic view showing a chassis dynamometer in a conventional example.
Figure 2:
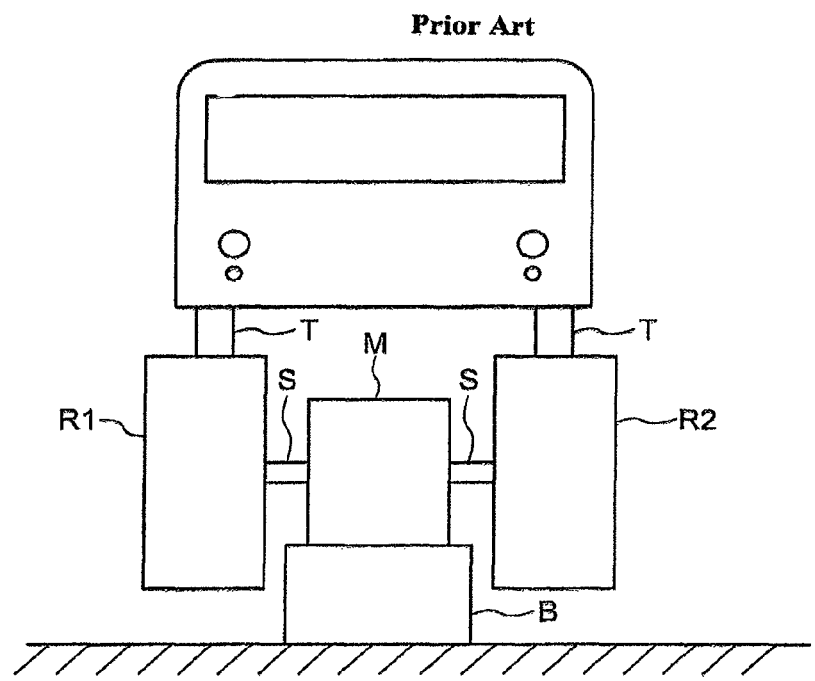
FIG. 2 A perspective view showing the chassis dynamometer in the conventional example.
Figure 3:
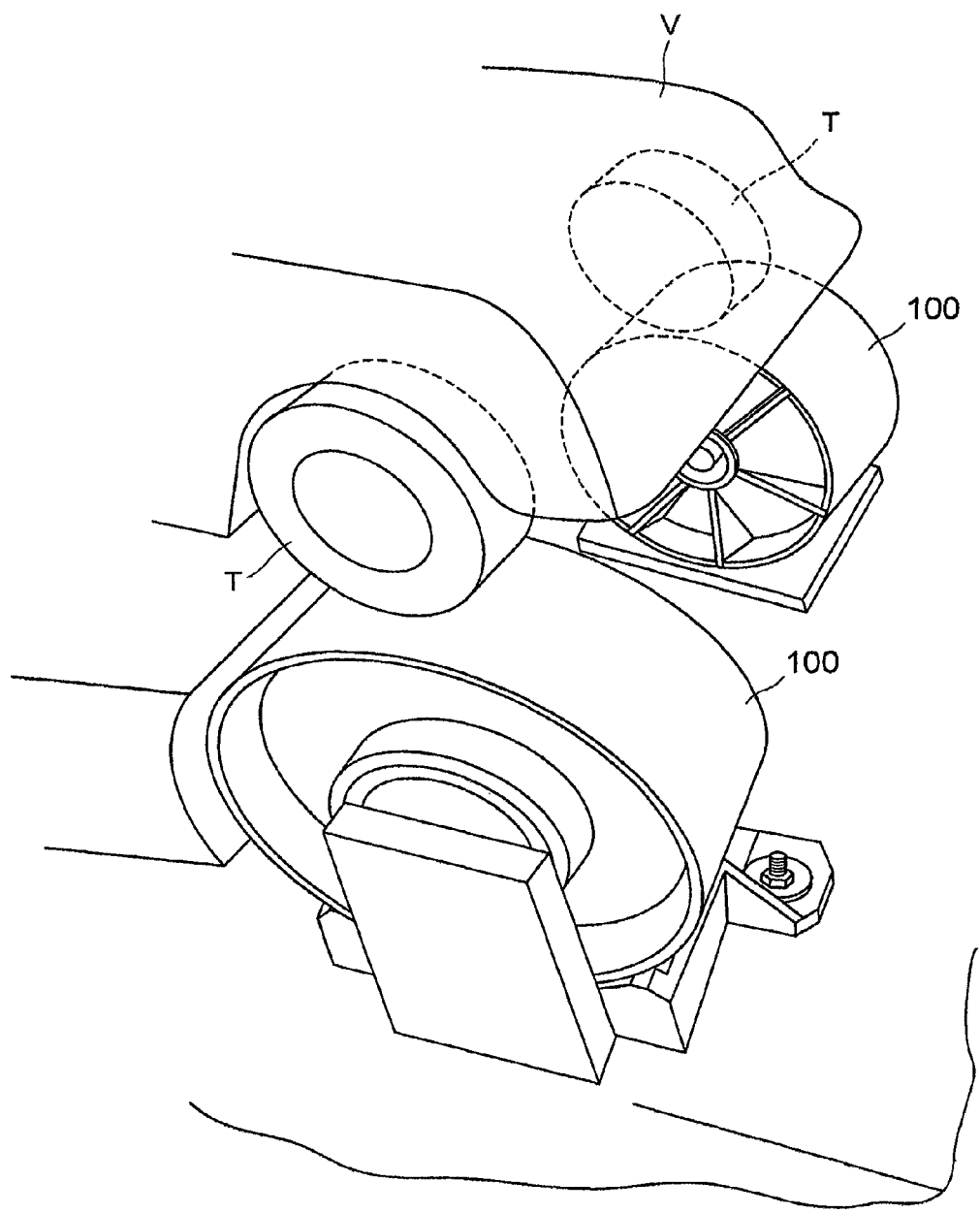
FIG. 3 A perspective view showing a state where the chassis dynamometer according to the present embodiment is installed on a bench.

An embodiment of the present invention will hereinafter be described with reference to the drawings. FIG. 3 is a perspective view showing a chassis dynamometer in a state of being installed on a bench according to the present embodiment. Referring to FIG. 3, two pieces of the same chassis dynamometers 100 are disposed in a way that has a common axial line of rotations. Drive wheels T, T of a vehicle V are placed on rollers of the chassis dynamometers 100.

Figure 4:
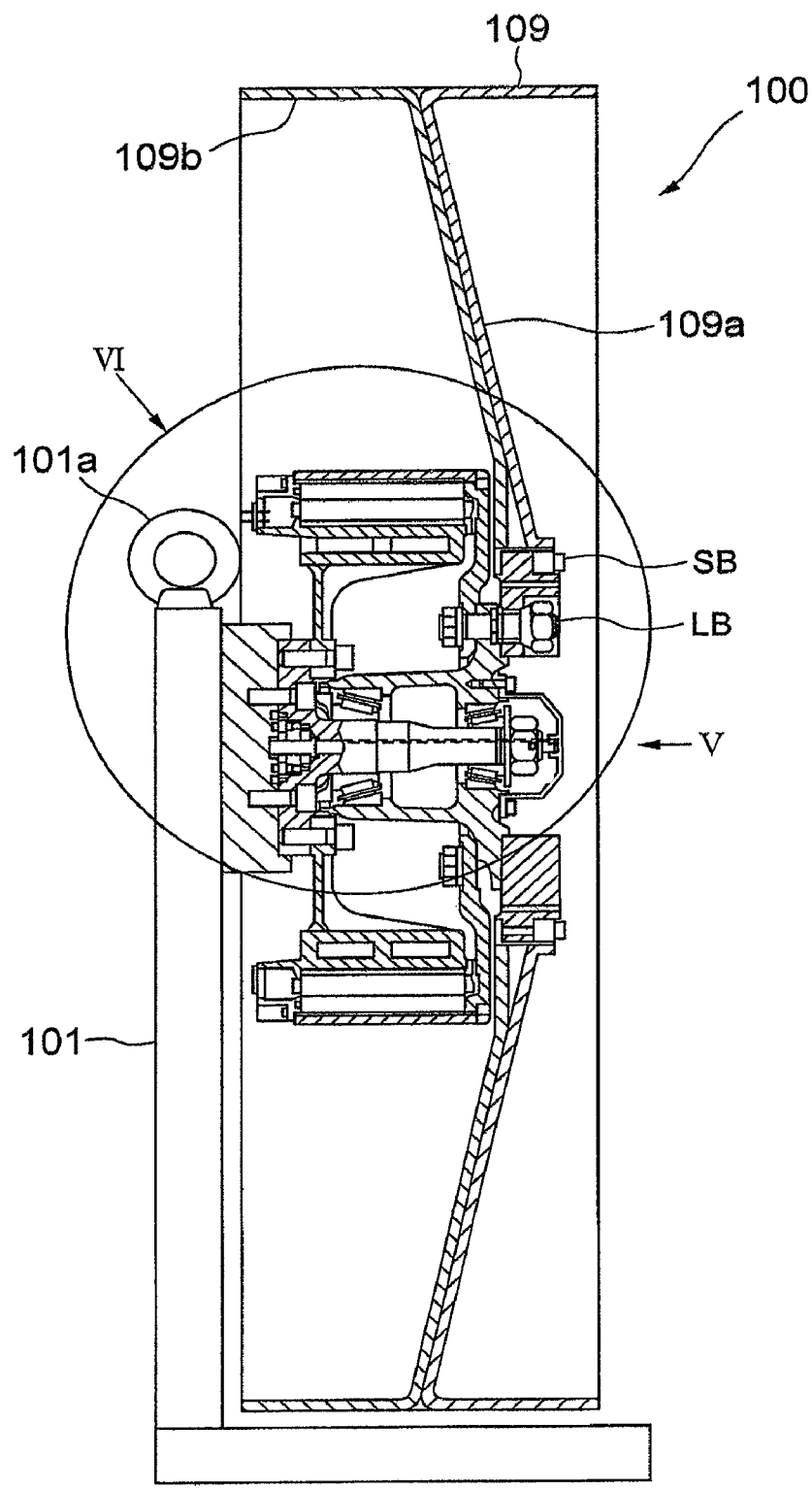
FIG. 4 A sectional view, taken in a direction of the axial line, of a chassis dynamometer 100 according to the present embodiment.
Figure 5:
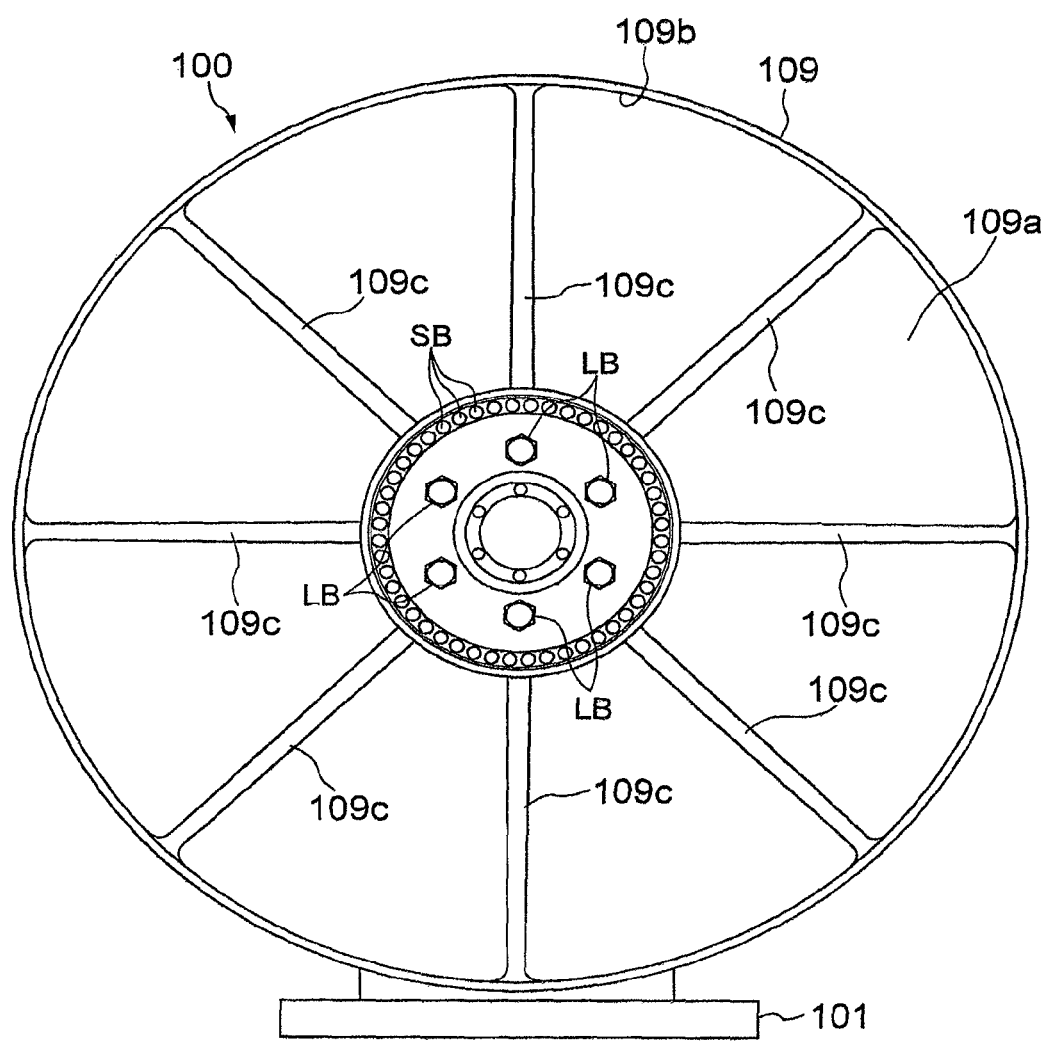
FIG. 5 A view of a configuration in FIG. 4 as viewed in an arrowhead direction V.

FIG. 4 is a sectional view taken in a direction of the axial line of the chassis dynamometers 100 according to the present embodiment. FIG. 5 is a view of the configuration as viewed in an arrowhead direction V. In FIG. 4, an L-shaped base seat 101 is fixed to a floor surface with bolts, and eyebolts 101a for suspension are screwed to an upper portion thereof.

Figure 6:
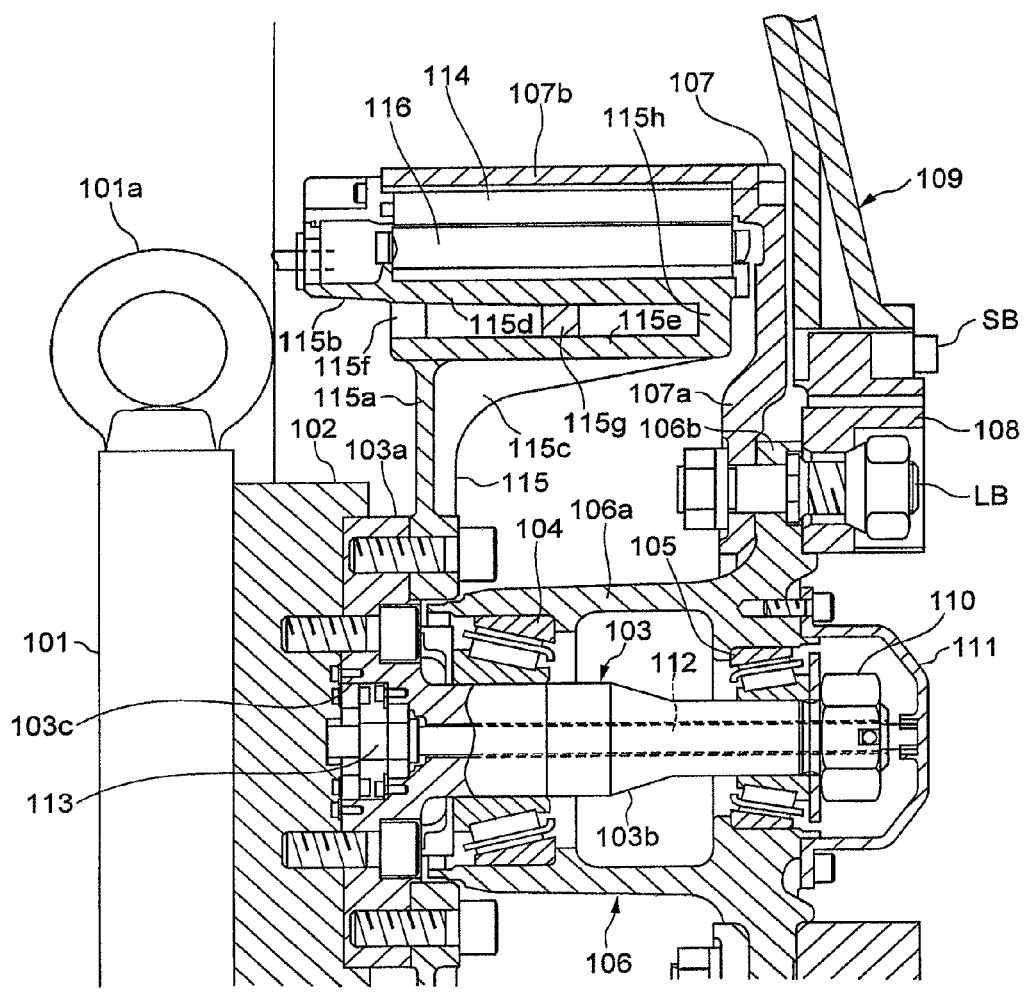
FIG. 6 An enlarged view of a portion depicted along an arrowhead VI in the configuration in FIG. 4.

FIG. 6 is an enlarged view showing a portion depicted along an arrowhead VI in the configuration in FIG. 4. Referring to FIG. 6, a disc-shaped base 102 is fixed to an upper side face of the base seat 101 with bolts. A fixed shaft 103 is fixed to the base 102 with the bolts. The fixed shaft 103 includes a disc portion 103a fixed to the base 102 and a hollowed shaft 103b extending from the disc portion 103a. A rotary proximal portion 106 is rotatably supported to a periphery of the hollowed shaft 103b via a pair of conical roller bearings 104, 104. Each of the bearings 104, 105 is given a preload from a nut 110 screwed to an end portion of the hollowed shaft 103b, thereby eliminating internal backlashes.

The rotary proximal portion 106 includes a hollowed cylindrical portion 106a supported by the bearings 104, 105, and a flange portion 106b extending outward in a radial direction from the hollowed cylindrical portion 106a. A rotor bracket 107 is fixed to an internal face (on the side of the base 102). The rotor bracket 107 taking an L-shape in section is constructed of a flange portion 107a fitted to the flange portion 106b and extending outward in the radial direction, and a cylindrical rotor retaining portion 107b extending from an outer peripheral edge of the flange portion 107a toward the inside (on the side of the base 102) in the direction of the axial line. Rotors 114 each consisting of permanent magnet are attached in alignment in the peripheral direction to an internal peripheral face of the rotor retaining portion 107b.

On the other hand, an annular torque meter 108 is secured to an external side of the flange portion 106b in the form of being co-fastened together with the rotor bracket 107 and the bolt being used in common. Rollers 109 are secured via a multiplicity of bolts to an outer periphery of the torque meter 108. The torque meter 108 detects the torque received by the rollers 109 by way of strain etc and is well known, and hence its in-depth description is omitted.

As illustrated in FIGS. 4 and 5, the roller 109 is configured by sticking two sheets of plate members, and includes a flange portion 109a fixed to the torque meter 108 and extending outward in the radial direction but inward in the direction of the axial line, a cylindrical outer peripheral portion 109b extending on both sides in the direction of the axial line from the outer peripheral edge of the flange portion 109a, and eight pieces of ribs 109c extending from an inner edge to the outer edge of the flange portion 109a and disposed at equal intervals in the peripheral direction. Note that the rollers 109 may be composed of aluminum and fiber-reinforced plastic, and may also be constructed as one integrated body without being limited to separate bodies.

Figure 7:
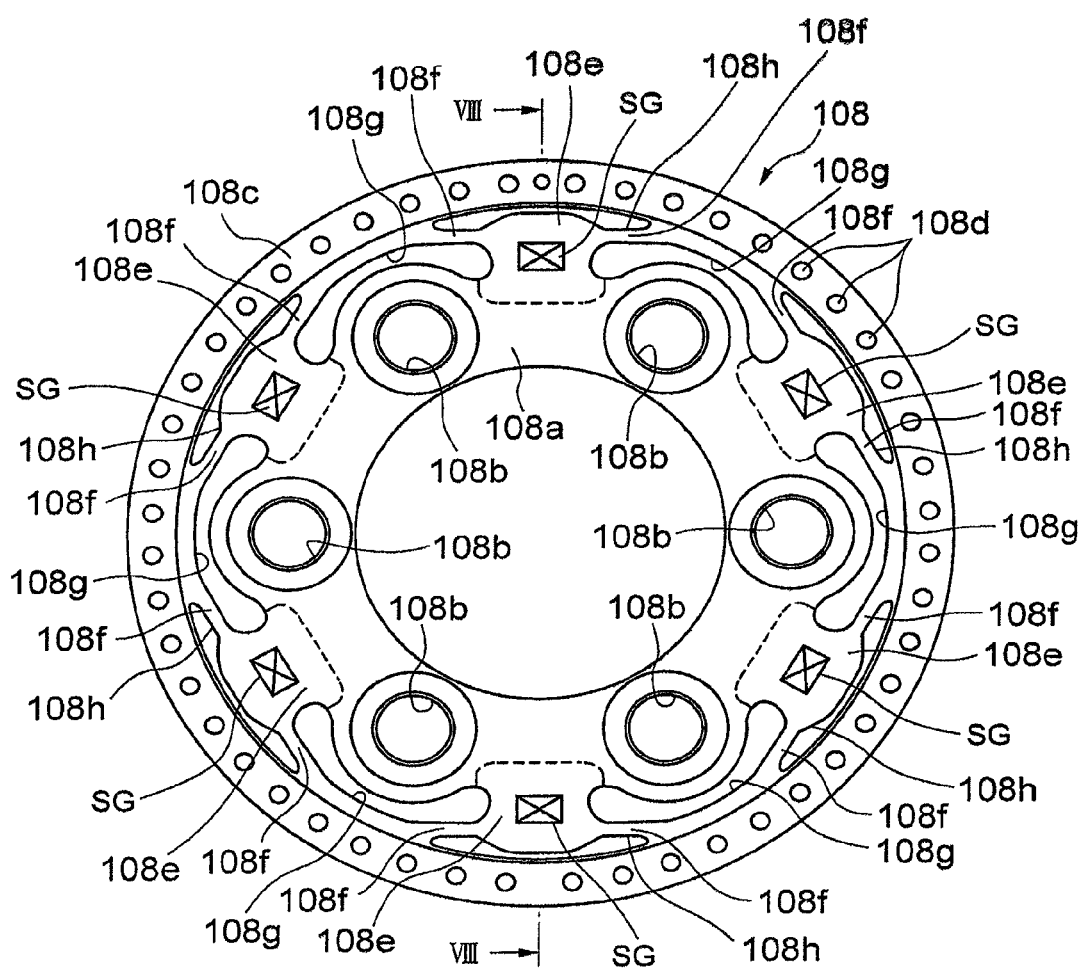
FIG. 7 A front view of a torque meter 108.
Figure 8:
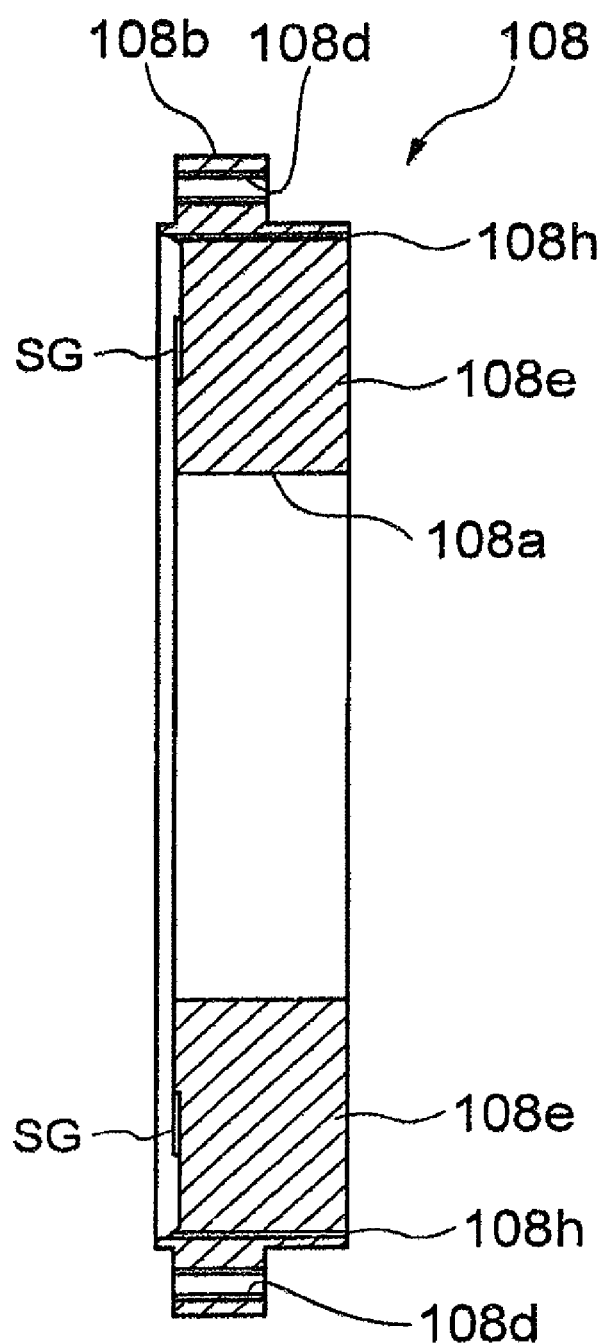
FIG. 8 A view of the configuration cut off by a VIII-VIII line and viewed in the arrowhead direction in FIG. 7.

FIG. 7 is a front view of the torque meter 108. FIG. 8 is a view of the configuration cut off by a VIII-VIII line and viewed in the arrowhead direction in FIG. 7. Referring to FIGS. 7 and 8, the torque meter 108 includes a proximal portion 108a fixed to the rotary proximal portion 106 and to the rotor bracket 107 by six pieces of large bolts LB (FIG. 6) inserted through bolt holes 108b, and a collar portion 108c fixed to the flange portion 109a of the roller 109 by a small bolt SB (FIG. 6) inserted through a holt hole 108d. In the proximal portion 108a, a strain gage SG is pasted onto a block-shaped measuring target portion 108e formed between the neighboring holts 108b. Each strain gage SG is connected to an unillustrated measuring circuit.

An outward portion, in the radial direction, of each measuring target portion 108e is connected to the collar portion 108c via a thin-plate-like connection portion 108f extending bidirectionally in tangential direction therefrom. Note that a slit-shaped aperture 108g is so formed as to extend toward the side face of the measuring target portion 108e from the outside, in the radial direction, of the bolt hole 108b, and a slit-shaped aperture 108h is formed outward in the radial direction of the measuring target portion 108e independently thereof, thereby enabling the measuring target portion 108e to deform to some extent when receiving the torque.

Figure 9:
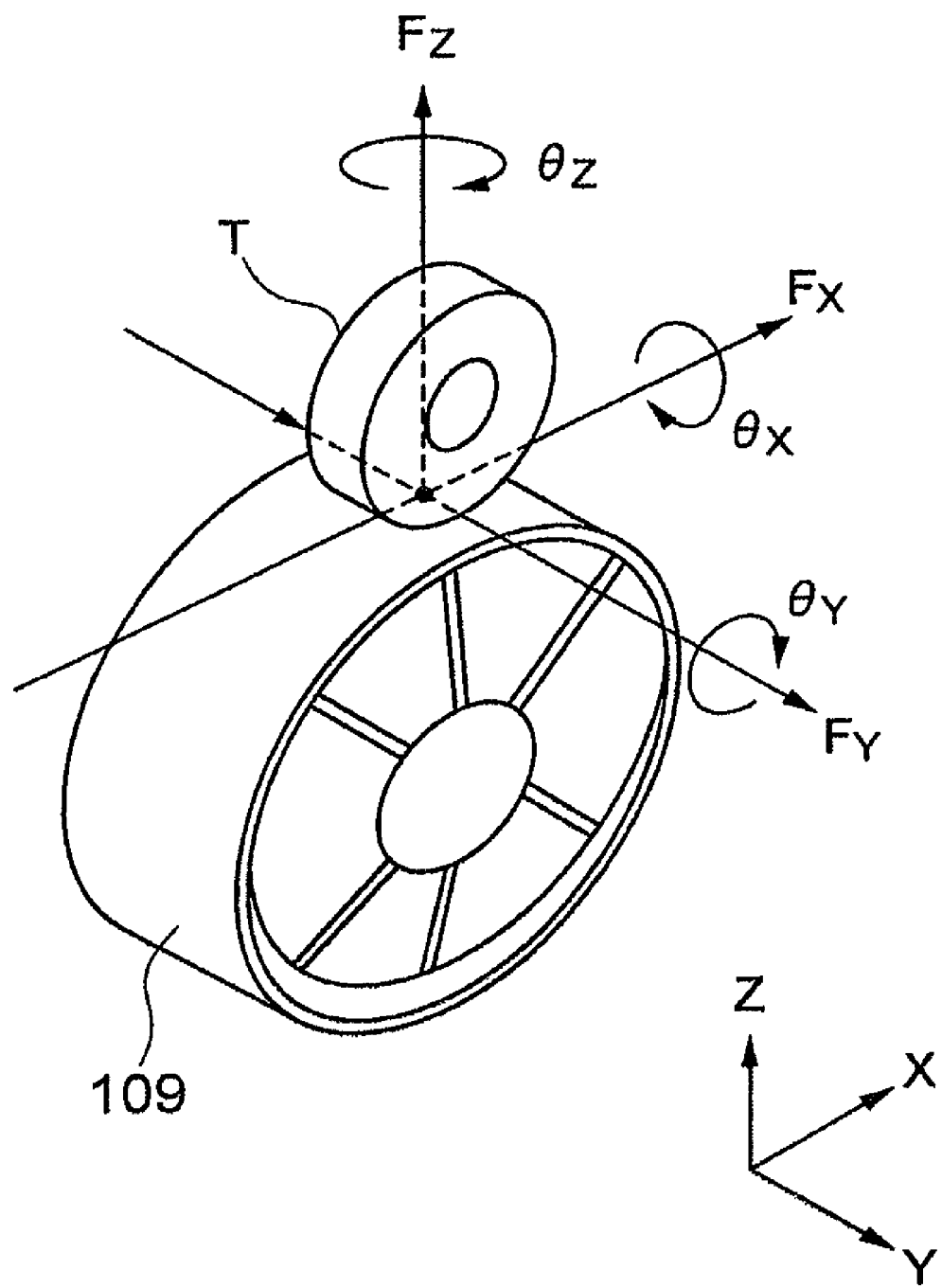
FIG. 9 A view showing a force acting on between a roller 109 and a wheel T when measured.

FIG. 9 is a view showing a force acting on between the roller 109 and the wheel T when measured. Referring to FIG. 9, with respect to a contact point between the roller 109 and the wheel T, when a traveling direction of the vehicle is set as the X-axis, a widthwise direction of the vehicle is set as the Y-axis and a tangential direction of the roller 109 is set as the Z-axis, it follows that the roller 109 receives a force (outer periphery tangential force) $F_X$ acting in the X-axis from the wheel T, a force $F_Y$ in the Y-axis direction, a force $F_Z$ in the Z-axis direction, a moment $\theta_X$ about the X-axis, a moment $\theta_X$ about the X-axis, a moment $\theta_Y$ about the Y-axis and a moment $\theta_Z$ about the Z-axis. This is termed "six force components", and an apparatus capable of measuring all of the six force components is called a six-force-component meter. The torque meter 108 can measure the six force components including dispersion forces other than force in the traveling direction (the X-axis direction) of the vehicle V that are applied to the roller 109, and therefore dynamically analyzes the vehicle V with high accuracy.

Referring to FIG. 6, a support member 111 serving also as a cover is secured with a bolt to an end face of the rotary proximal portion 106 inward in the radial direction of the torque meter 108. A right end, as viewed in FIG. 6, of a connection shaft 112 extending through the hollowed shaft 103b of the fixed shaft 103 engages with the support member 111 in a way that rotates integrally. The other end of the connection shaft 112 is connected to a resolver 113 disposed within a recessed portion 103c formed at a root of the hollowed shaft 103b. The resolver 113 magnetically detects a relative displacement between a stator fitted to the fixed shaft 103 and a rotor fitted to the connection shaft 112 and can detect relative rotations between the fixed shaft 103 and the connection shaft 112 on the basis of the relative replacement, i.e., a rotating speed of the roller 109.

The resolver 113 is, for example, put on the market as a trade name [Singlsyn] by Tamagawa Seiki Co., Ltd. As described above, a scheme of providing the resolver 113 on the root side of the fixed shaft 103 intends to avoid magnetic interference with the torque meter 108, however, if a proper shield is employed, the resolver 113 can be provided in the vicinity of the torque meter 108. Note that a means for detecting the rotating speed of the roller 109 can involve using, without being limited to the resolver, a variety of rotation detectors such as magnetic or optical encoders.

Referring to FIG. 6, a stator bracket 115 is fixed with a bolt to the disc portion 103a of the fixed shaft 103. The stator bracket 115 taking an L shape in section is constructed of a flange portion 115a fitted to the disc portion 103a and extending outward in the radial direction, and of a cylindrical stator retaining portion 115b directed outward in the direction of the axial line from the outer peripheral edge of the flange portion 115a and extending inward in the radial direction of the rotor retaining portion 107b. A stator 116 is fitted, with a slight gap from the rotor 114, to the outer peripheral face of the stator retaining portion 115b. The motor is structured by the rotor 114 and the stator 116.

An unillustrated wiring extends along the surface of the stator bracket 115 from a coil of the stator 116 and connects to an external inverter unit (unillustrated). The coil of the stator 116 emits heat when driving, and it is therefore preferable to form a plurality of fins 115c at equal intervals ranging from the flange portion 115a to the stator retaining portion 115b in order to enhance a heat radiation effect. These fins 115c contribute, as reinforcing ribs, to improve rigidity of the stator bracket 115.

Additionally, in the present embodiment, the stator retaining portion 115b takes a double-cylindrical shape. More specifically, a closed space is provided between an external wall 115d and an internal wall 115e, and a jacket through which cooling water passes is formed in this closed space. To be more specific, three partition walls 115f, 115g, 115h spaced away from each other in the direction of the axial line are provided consecutively in the peripheral direction between the external wall 115d and the internal wall 115e. When the cooling water is supplied from outside via an inlet (unillustrated) of the partition wall 115f, the cooling water flows clockwise (as viewed in the direction in FIG. 5) within a path between the partition walls 115f and 115g, then, after making a U-turn in any one of positions, flows counterclockwise (as viewed in the direction in FIG. 5) within a path between the partition walls 115g and 115h, and is discharged to outside from an unillustrated outlet. This stator bracket 115 may be formed by casting and may also be formed by joining cylindrical members having different diameters to each other by welding.

An operation in the present embodiment will hereinafter be described. As illustrated in FIG. 3, when turning ON an unillustrated switch in the state where the drive wheels T, T of the vehicle V are placed on the rollers 109, a high-frequency current is transmitted via the wiring to the stator 116 from the inverter unit, the magnetic force is thereby generated between the stator 116 and the rotor 114, whereby the roller 109 can be rotationally driven by use of the magnetic force via the rotary proximal portion 106. At this time, a minute rotational deviation occurs corresponding to the torque between the proximal portion 108a and the collar portion 108b of the torque meter 108, consequently the measuring target portion 108e gets elastically deformed, the strain occurs in the strain gage SG, and hence a torque value can be detected from a variation in resistance value. Accordingly, the resistance caused when applying an engine brake of the vehicle can be measured with the high accuracy by the torque meter 108.

Namely, according to the chassis dynamometer 100 in the present embodiment, each of the flange portions 109a of the rollers 109 on which the wheels of the vehicle are placed is connected via the torque meter 108 to the rotor bracket 107 of the rotor 114 of the motor, thereby enabling the measurement of the torque to be avoided from being affected by the bearings. Accordingly, an error in the measurement of the torque is caused mainly by a windage loss of the roller 109. The windage loss, which is determined based on the structure of the roller 109 and can be reduced to the greatest possible degree, takes a stable value without being influenced by a temperature after the structure has been determined and can be precisely corrected by use of an experimental value. Further, the rotary proximal portion 106 can be designed to have the extremely high rigidity in terms of the mechanical structure because of using none of a shaft torque meter, thereby enabling an evaluation of the torque measurement to be realized in a fast response.

On the other hand, when the drive wheels T, T are rotated by the power given from the engine, whereby the rollers 109 are rotationally driven. At this time, the rotor 114 rotates via the rotary proximal portion 106, and consequently the electric power is generated on the side of the stator 116. Namely, it follows that the driving force supplied from the drive wheels T, T can be converted into the electricity and absorbed by using the motor as a generator. The driving force at this time can be measured by the torque meter. Especially in the present embodiment, the driving force generated at each of the drive wheels T, T can be measured, and it is therefore feasible to confirm distribution of the power distributed to the respective drive wheels by use of, e.g., a differential mechanism. Further, in a so-called all-wheel-drive vehicle such as a 4WD (four wheel drive) car, the chassis dynamometer 100 is disposed at each wheel, thereby enabling the driving force to be measured independently.

In the chassis dynamometer 100, even when the heat is evolved in the coil of the stator 116, the stator retaining portion 115b of the stator bracket 115 is cooled by the cooling water, and the respective portions can be avoided from being affected by the heat.

Moreover, according to the chassis dynamometers 100 in the present embodiment, the motors are disposed inward in the radial directions of the rollers 109, 109 on which the drive wheels T, T of the vehicle V are placed, thereby enabling the torsion rigidity of the rotation system to be increased owing to the box-shaped high rigidity structure constructed of the torque meter 108 and the rotary proximal portion 106 and the rotational balance to be improved by concentrating heavy masses in a way that saves the space. Further, since the vehicle load can be applied from outward in the radial direction to the conical bearings 104, 105 that bear the rollers 109, the flexural moment does not act unlike the case of supporting the rotary shaft as by the conventional technology, and a long life-span of the conical bearing can be ensured. Further, the motor is provided inwardly of the roller 109, and hence the distance between the rollers 109, 109 can be arbitrarily set. Accordingly, the chassis dynamometers 100, 100 can be installed in adjustment to the positions of the individual drive wheels T, T of the vehicle V, whereby a width of the roller 109 can be reduced, an inertial mass can be restrained small, and consequently a test for a low μ path can be reenacted on the bench while saving the space.

Figure 10:
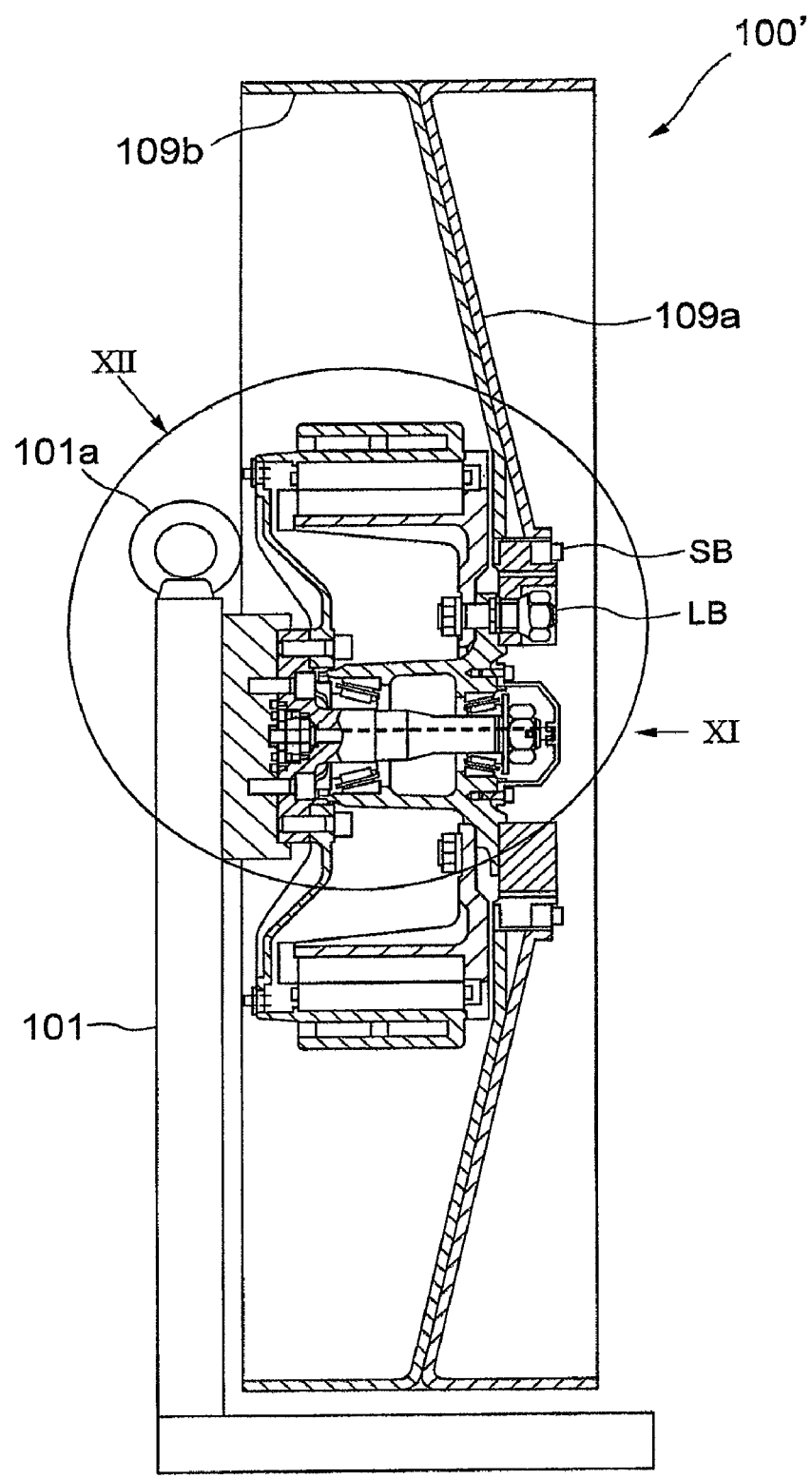
FIG. 10 A sectional view taken in the direction of the axial line, showing a chassis dynamometer 100' according to another embodiment.
Figure 11:
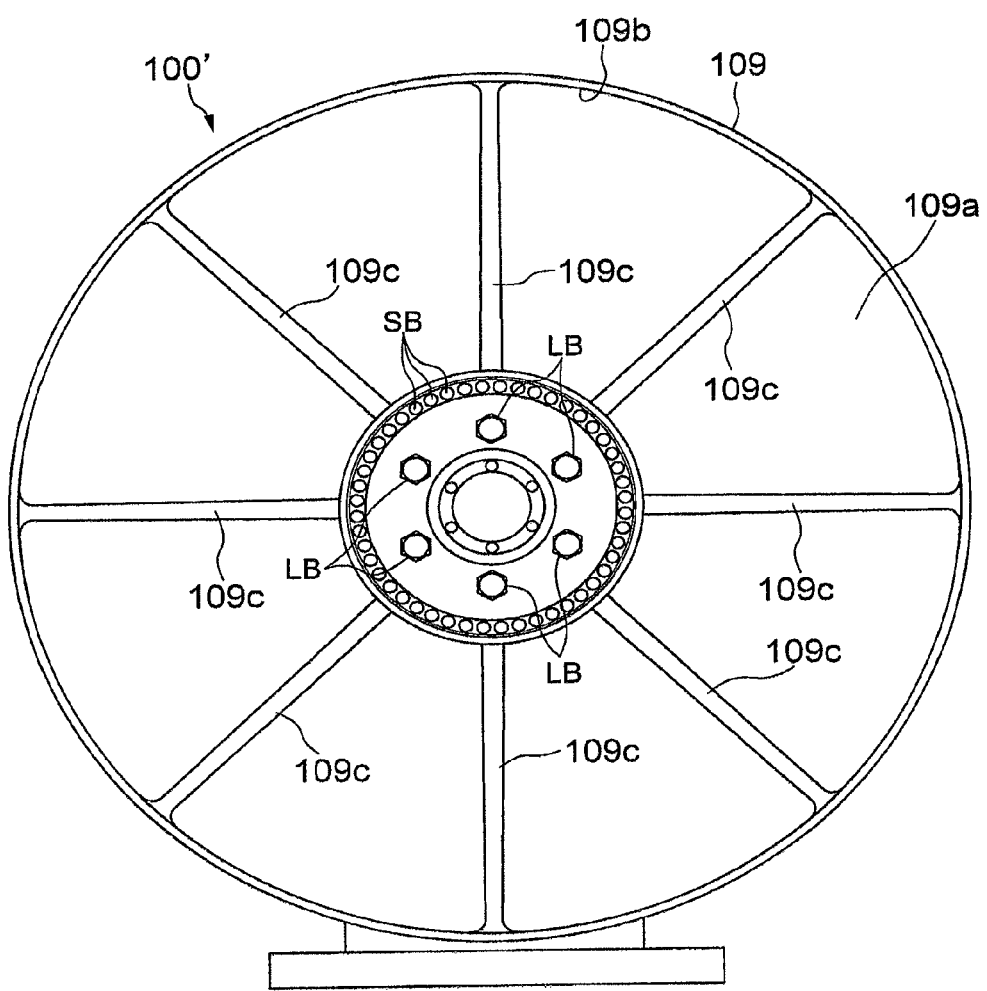
FIG. 11 A view of the configuration in FIG. 10 as viewed in an arrowhead direction XI.
Figure 12:
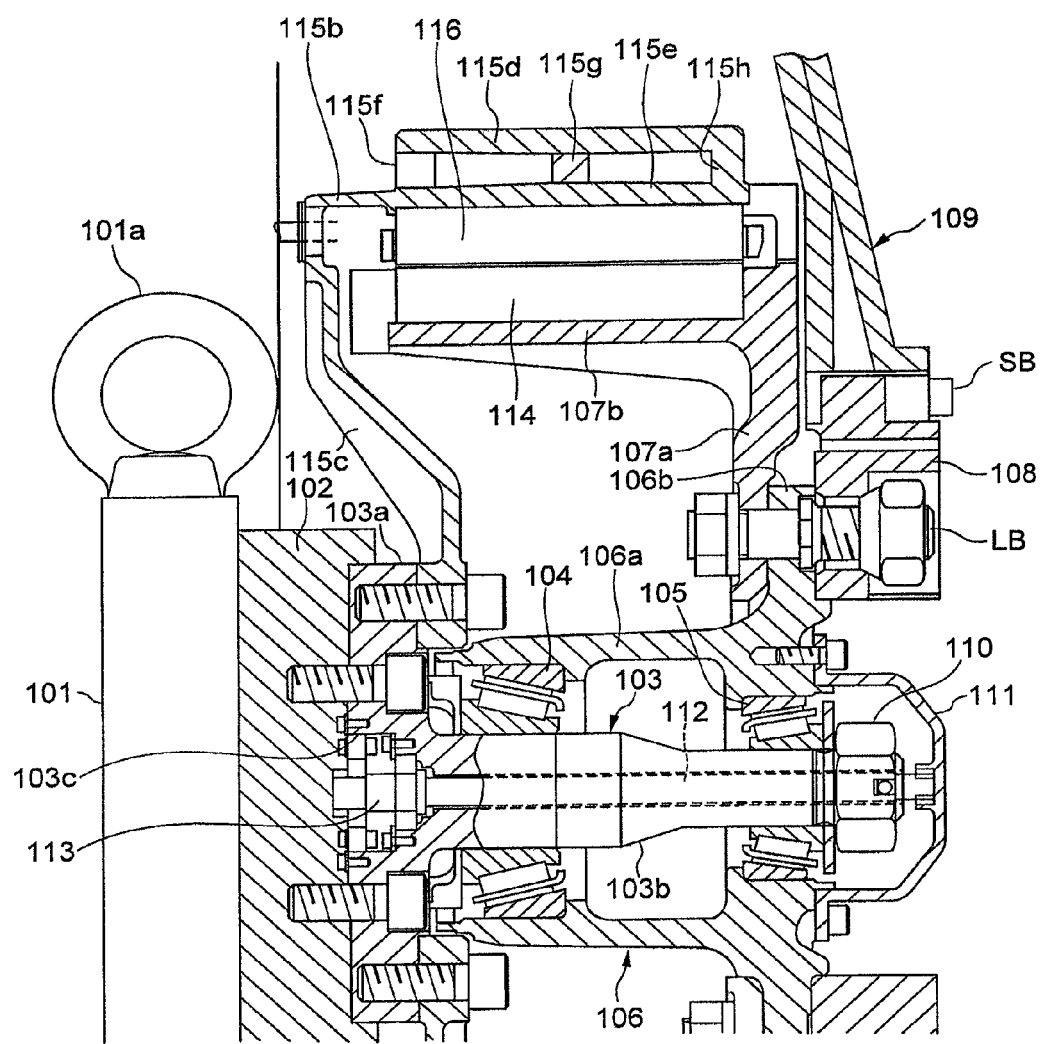
FIG. 12 An enlarged view of a portion depicted along an arrowhead line XII in the configuration in FIG. 10.

FIG. 10 is a sectional view taken in the direction of the axial line, showing a chassis dynamometer 100' according to another embodiment, and FIG. 11 is a view of the configuration in FIG. 10 as viewed in an arrowhead direction XI. FIG. 12 is an enlarged view of a portion depicted along an arrowhead line XII in the configuration in FIG. 10.

In the present embodiment, the stator retaining portion 115b of the stator bracket 115 is located outward in the radial direction of the rotor retaining portion 107b of the rotor bracket 107, i.e., the rotor 114 is disposed inward in the radial direction of the stator 116, whereby the diameter thereof can be restrained small and the inertial mass is reduced. Other components are common to the embodiment discussed above and marked with the same symbols and numerals, of which the descriptions are omitted.

The present invention has been discussed so far in detail by way of the embodiments but should not be construed in the way of being limited to the embodiments discussed above, and can be, as a matter of course, adequately modified and ameliorated within the range that does not deviate from the gist of the invention. For example, part of the motor may be extruded from the end portion of the rotor in the direction of the axial line thereof.

What is claimed is:

1. A chassis dynamometer for a vehicle comprising:
a base seat;
a fixed shaft having one end thereof attached to said base seat;
a rotary proximal portion rotatably supported to said fixed shaft;
a roller connected to said rotary proximal portion, for loading a wheel of a vehicle; and
a motor connected to said roller so that power can be transmitted therebetween,
wherein said roller has a single flange portion connected to said rotary proximal portion and extending obliquely to an axis of the fixed shaft, and an outer peripheral portion extending both axial directions from an outer periphery of said flange portion and disposed outward in the radial direction of said motor.

2. A chassis dynamometer according to claim 1, wherein said flange portion extends inward in a radial direction of said roller loading a wheel of a vehicle, and a rotor bracket for supporting a rotor of said motor is connected via a torque meter capable of measuring at least an outer peripheral tangential force of said roller.

3. A chassis dynamometer according to claim 1, wherein the rollers are disposed separately, and the motor operates each of the rollers independently.

4. A chassis dynamometer according to claim 1, wherein said motor includes a stator fitted to said base seat, and a rotor fitted to said roller so as to integrally rotate together therewith.

5. A chassis dynamometer according to claim 4, wherein said stator is disposed outward in the radial direction of said rotor.

6. A chassis dynamometer according to claim 4, wherein said stator is disposed inward in the radial direction of said rotor.

7. A chassis dynamometer according to claim 1, wherein said roller is formed by assembling two folded plates.

8. A chassis dynamometer according to claim 7, wherein said flange portion extends inward in a radial direction of said roller loading a wheel of a vehicle, and a rotor bracket for supporting a rotor of said motor is connected via a torque meter capable of measuring at least an outer peripheral tangential force of said roller.

9. A chassis dynamometer according to claim 7, wherein said motor includes a stator fitted to said base seat, and a rotor fitted to said roller so as to integrally rotate together therewith.

10. A chassis dynamometer according to claim 9, wherein said stator is disposed outward in the radial direction of said rotor.

11. A chassis dynamometer according to claim 9, wherein said stator is disposed inward in the radial direction of said rotor.

12. A chassis dynamometer for a vehicle comprising:
a base seat;
a fixed shaft having one end thereof attached to said base seat;
a rotary proximal portion rotatably supported to said fixed shaft;
a roller connected to said rotary proximal portion, for loading a wheel of a vehicle; and
a motor connected to said roller so that power can be transmitted therebetween,
wherein said roller has a single flange portion connected to said rotary proximal portion and extending obliquely to an axis of the fixed shaft, and an outer peripheral portion extending both axial directions from an outer periphery of said flange portion and disposed outward in the radial direction of said motor,
wherein said flange portion extends inward in a radial direction of said roller loading a wheel of a vehicle, and a rotor bracket for supporting a rotor of said motor is connected via a torque meter capable of measuring at least an outer peripheral tangential force of said roller, and
wherein said torque meter is a six-force-component meter.

13. A chassis dynamometer for a vehicle comprising:
a base seat;
a fixed shaft having one end thereof attached to said base seat;
a rotary proximal portion rotatably supported to said fixed shaft;
a roller connected to said rotary proximal portion for loading a wheel of a vehicle; and
a motor connected to said roller so that power can be transmitted therebetween,
wherein said roller has a single flange portion connected to said rotary proximal portion and extending obliquely to an axis of the fixed shaft, and an outer peripheral portion extending both axial directions from an outer periphery of said flange portion and disposed outward in the radial direction of said motor,
wherein said roller is formed by assembling two folded plates,
wherein said flange portion extends inward in a radial direction of said roller loading a wheel of a vehicle, and a rotor bracket for supporting a rotor of said motor is connected via a torque meter capable of measuring at least an outer peripheral tangential force of said roller, and
wherein said torque meter is a six-force-component meter.

* * * * *